United States Patent [19]

Figard et al.

[11] Patent Number: 4,628,013
[45] Date of Patent: Dec. 9, 1986

[54] PHOTOELECTROCHEMICAL CELL

[75] Inventors: Joseph E. Figard; David C. Rohlfing, both of Bartlesville, Okla.; Ralph S. Becker, Houston, Tex.

[73] Assignee: Phillips Petroleum Company, Bartlesville, Okla.

[21] Appl. No.: 490,595

[22] Filed: May 2, 1983

[51] Int. Cl.$^4$ .............................................. H01M 6/36
[52] U.S. Cl. ..................................................... 429/111
[58] Field of Search .................. 429/111; 136/258 AM

[56] References Cited

U.S. PATENT DOCUMENTS 3,271,198  9/1966  Winegradoff et al. ............... 429/111
4,235,955 11/1980  Sammells et al. .................... 429/111

OTHER PUBLICATIONS

Ayers, "P-Type Amorphous Silicon/Liquid Junction Solar Cell", J. Electrochem. Soc, Jul. 1983, vol. 129 (7).
Calabrese et al., "Photoelectrochemical Cells Based on Amorphous Hydrogenated Silicon Thin Film Electrodes and the Behavior of Photoconductor Electrode Materials", J. Am. Chem. Soc., May 1982, 104, p. 2412.
Harrison et al., "Characterization of Intrinsic Amorphous Hydrogenated Silicon as a Thin-Film Photocathode Material. Efficient Photoreduction Processes in Aqueous Solution", J. Am. Chem. Soc., Jul. 1983, 105, 13, p. 4212.
Appl. Phys. Lett. 40, 281-283 (1982).
J. Appl. Phys. 50, 2848-2851 (1979).
J. App. Phys. 53, 6911-6918 (1982).
J. Electrochem. Soc. 127, 1209-1211 (1980).
J. Electrochem. Soc. 129, 1644-1646 (1982).

Primary Examiner—Aaron Weisstuch
Attorney, Agent, or Firm—French and Doescher

[57] ABSTRACT

A photoelectrochemical cell is provided having an amorphous silicon electrode. A system employing a $V^{+3}/V^{+2}$ redox system is described which enables the amorphous silicon electrode to function as the cathode, reducing the rate of photo-oxidation during the operation of the photoelectrochemical cell to convert solar energy to electricity.

15 Claims, 1 Drawing Figure

PHOTOELECTROCHEMICAL CELL

BACKGROUND OF THE INVENTION

This invention relates to the conversion of solar energy to electricity. It further relates in one embodiment to a photoelectrochemical cell employing an amorphous silicon electrode.

It is known that single-crystal silicon is a promising semiconductor for conversion of solar energy to electricity in photovoltaic cells. Attempts have been made to use crystalline silicon as an electrode in a photoelectrochemical cell. It has been found that photo-oxidation yielding SiO layers occurs rapidly. The use of single-crystal silicon in such cells is expensive, and it is always desirable to employ less expensive and more efficient materials when possible. It is also desirable to minimize photo-oxidation of the semiconductive amorphous silicon electrode.

It is therefore an object of the invention to provide a photoelectrochemical cell. In one embodiment, it is an object to provide a photoelectrochemical cell having an amorphous silicon electrode. It is a further object to reduce photocorrosion of a semiconductive electrode in a photoelectrochemical cell.

BRIEF DESCRIPTION OF THE DRAWING

The FIGURE is a schematic diagram of one embodiment of the invention photoelectrochemical cell.

SUMMARY OF THE INVENTION

Figure 1:
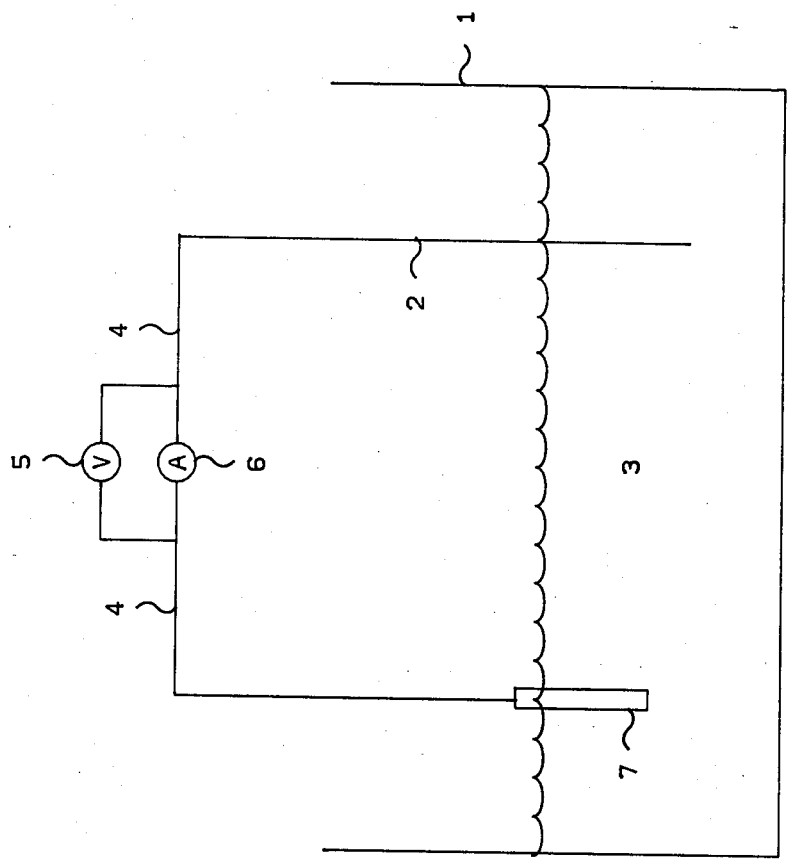
Figure 1:
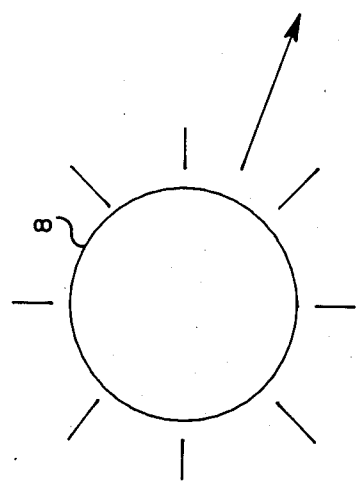

According to the invention, an intrinsic amorphous silicon electrode is employed in a photoelectrochemical cell having an electrolyte dispersed in a liquid medium. The choice of the electrolyte determines whether the electrode acts as the anode or cathode, and varying the electrolyte can alter the open circuit potential difference between the intrinsic amorphous silicon electrode and a counterelectrode. Proper choice of the electrolyte solution thus enables the use of the intrinsic amorphous silicon electrode as the cathode. Preferably for use of the photoelectrode as the cathode, the electrolyte is an aqueous solution of $V^{+3}/V^{+2}$. Use of the intrinsic amorphous silicon electrode as the cathode has as one advantage the reduction of the rate of photo-oxidation occurring at the amorphous silicon electrode.

DETAILED DESCRIPTION OF THE INVENTION

The photoelectrochemical cells of the invention comprise two electrodes in contact with an electrolyte dispersed in a liquid medium. One electrode is a semiconducting photoelectrode comprising thin-film amorphous silicon on a solid substrate material. The counterelectrode is a conductive material such as a noble metal or glassy carbon.

The amorphous silicon electrode can be prepared by any suitable technique for applying a semiconductive thin film on a substrate material, such as radio frequency plasma discharge or sputtering. In the radio frequency plasma discharge method, 10% by volume of silane gas in argon is passed into an evacuated reaction chamber containing the desired substrate. The silane is decomposed at an elevated temperature by a radio frequency plasma discharge and the amorphous silicon hydride (a-Si:H) product of silane decomposition is deposited on the substrate.

Suitable substrates include conductive materials which are resistant to corrosion in aqueous environments, such as stainless steel, titanium metal and glass coated with a conductive transparent oxide such as indium-tin oxide. The electrode substrate containing deposited amorphous silicon is generally encased in an inert substance such as epoxy resin to cover all but an exposed amorphous silicon photoactive area.

The amorphous silicon hydride film should be essentially free of pin holes and suface defects and should not exhibit a dark current. The ohmic contact can be made by securing a conductive wire such as a copper wire coated at the connecting end portion with In-Ga eutectic.

The coated end of the wire is secured to the indium-tin oxide by, for example, applying conductive silver epoxy and drying at an elevated temperature. The amorphous silicon film can be etched if needed to remove any oxides of silicon present.

In the operation of the photoelectrochemical cell, the amorphous silicon is exposed to light of wavelengths less than about 720 nm, such as sunlight, resulting in the migration of ions through the aqueous solution and the flow of electric current from the anode to the cathode via a conductive path.

According to one aspect of the present invention, the photoelectrochemical cell is designed so as to employ the amorphous silicon hydride electrode as the photocathode. The counterelectrode will function as the anode. If desired for monitoring the electrochemical reaction, a standard electrode such as a calomel electrode can be employed.

The redox couple employed in the electrolyte solution can be any chemical system which causes the amorphous silicon electrode to function as a cathode in the photoelectrochemical cell and which is soluble in the liquid medium employed. Suitable redox systems for this purpose include $V^{+3}/V^{+2}$ and $Eu^{+3}/Eu^{+2}$. The concentration of the redox system in the liquid medium can vary depending on the cell but will suitably range from about 0.01 to about 1M. A $V^{+3}/V^{+2}$ redox system can be prepared by zinc amalgam reduction of $NH_4VO_3$ dissolved in 6M HCl. $V^{+3}/V^n$ couples where $n>2$ can be produced by introducing oxygen into the $V^{+3}/V^{+2}$ solution.

The liquid medium can be aqueous or nonaqueous, but is preferably water. A supporting electrolyte can be employed to provide enhanced ionic conductivity to the solution. Any suitable electrolytic substance soluble in the liquid medium can be used, including but not limited to acids such as sulfonic acid, bases such as sodium hydroxide, and buffers such as sodium phosphate. Sodium sulfate has been found to be a suitable electrolyte. The concentration of the electrolyte in deionized water depends upon the type of system employed, but will generally range from about 0.01 to about 2M.

Amorphous silicon can be deposited by any suitable method, including radio frequency plasma discharge, sputtering, and chemical vapor deposition, as are known in the art. A suitable deposition method has been found to be radio frequency plasma decomposition of 10% $SiH_4$ in argon on an indium-tin oxide coated glass substrate. If desired, doping of the amorphous silicon film can be accomplished by adding a minor amount, generally about 1% of a suitable doping agent to the $SiH_4$—Ar stream. Suitable n-type dopants include hydrides of P, As and Sb. Suitable p-type dopants include B, Al and Ga. Doping the electrode as a general rule offers the advantage of higher conductivity, often, however, at the expanse of photoconductivity.

The amorphous silicon photocathode of the invention photoelectrochemical cells is suitably intrinsic amorphous silicon hydride and does not contain doping agents in an amount which would affect the photoconductive properties of the electrode.

Referring to the FIGURE to describe one embodiment of the invention in operation, photoelectrochemical cell 1 includes noble metal electrode 2 having one end portion immersed in aqueous electrolyte 3 comprising a $V^{+3}/V^{+2}$ redox system. Electrode 2 is connected via conductive wire 4 and optional voltmeter 5 and ammeter 6 to photocathode 7 comprising intrinsic amorphous silicon hydride on a solid conductive substrate. Light from solar energy source 8 strikes the photoconductive intrinsic amorphous silicon hydride surface and produces a reduction of $V^{+3}$ ions in the electrolyte and oxidation of $V^{+2}$ ions at the platinum electrode, resulting in a migration of $V^{+2}$ ions from the amorphous silicon electrode to the platinum electrode, a migration of $V^{+3}$ ions in the opposite direction, and a flow of electrons through conductor 4 from the platinum anode to the amorphous silicon hydride cathode. Such a system can be used to power an electric appliance or process in circuit 4, or a cell such as that shown can be used, with appropriate recorder or signal, as a light-detecting device.

The operation of the photoelectrochemical cell according to the invention enables the longer-term use of an amorphous silicon electrode, because of the lower rate of formation of $SiO_x$ on the surface of the a-Si:H film.

EXAMPLE I

In this example the preparation of amorphous silicon electrodes employed in the photoelectrochemical cells of this invention is described. These electrodes were amorphous silicon-hydrogen alloy (a-S:H) films deposited on indium-tin oxide (ITO) coated glass plates (cross-sectional area of $2'' \times 2.5''$; sheet resistance of 25 ohm per square; marketed by Practical Products, Inc., 7820 Concord Hills Lane, Cincinnati, Ohio).

The deposition of the amorphous silicon-hydrogen alloy films was carried out by decomposition of argon-diluted silane source gas (plus about 1 volume-% $PH_3$ for n-doped films) in a radio frequency plasma deposition system (Tegal Plasmaline 100, marketed by Tegal Corporation, 11 Commerce Blvd., Novato, CA), at about 13.6 MHz. The source gas was introduced into the evacuated deposition chamber through a perforated electrode connected to a radio frequency (RF) generator, which supplied 20–100 watts of power. The second electrode carried an ITO coated glass plate as substrate. The deposition system electrodes were made of aluminum of 15 cm² cross-section; the gap between the electrodes was about 3 cm. A plasma of the source gas was formed between the electrodes, and an amorphous silicon film (a-Si:H) was deposited on the substrate which was heated by a temperature-controlled heater to about 225°–325° C.

The chamber pressure during deposition was about 0.06–0.15 mm Hg. In the case of undoped, intrinsic a-Si:H films, the source gas was a mixture of 10 volume-% $SiH_4$ in argon having a flow rate of 50 standard cubic centimeters per minute (SCCM). In the case of phosphorus-doped (n-type a-Si:H), a mixture of 1 volume-% $PH_3$ in Ar having a flow rate of about 5.6 SCCM was mixed with the $SiH_4$-Ar stream so as to provide a gas mixture having a $PH_3:SiH_4$ molar ratio of 1:100.

The formed a-Si:H films had a thickness of about 0.1–1.0 micrometers, preferably 0.4–0.5 micrometers, as determined from the thin film interference pattern present in the near IR portion of the absorption spectrum measured with a Cary 14 spectrophotometer (marketed by Varian Associates, Palo Alto, CA) at about 800–2000 nanometers. The hydrogen content of these films ranged from about 5–50 atomic percent hydrogen as estimated from IR absorption spectra measured with a PE-580B spectrometer (marketed by Perkin-Elmer Corporation, Instrument Division, Norwalk, CT).

The glass plates coated with deposited a-Si:H films were cut into plates of 0.8–1 cm² area and were then etched for about 45 seconds at about 16° C. in a diluted buffered HF solution for removal of $SiO_2$. The HF solution was prepared by mixing 1 part by weight of 49 wt-% hydrofluoric acid, 7 parts by weight of an aqueous 40 weight-% $NH_4F$ solution and 24 parts by weight of water. The ohmic contact was made by coating one end of a copper wire in an In-Ga eutectic and attaching this wire end to the ITO glass plate by means of a conductive silver epoxy, which was dried at 60° C. The copper wire and the electrode contact area were coated with an insulating epoxy. The wire was then threaded through a glass tube sealed with the insulating epoxy. Only the a-Si:H portion of the electrode was not coated with an insulating epoxy layer.

EXAMPLE II

In this example photoelectrochemical cells employing amorphous a-Si:H electrodes and the measurement of photoelectrical parameters of these cells are described. Electrolytes were prepared from analytical grade reagents dissolved in deionized water. The concentration of the redox couples was generally 0.01–0.1 mole/l, whereas the concentration of an additional, supporting electrolyte ($Na_2SO_4$) was commonly 0.2–0.5 mole/l. All electrochemical experiments were carried out in a glass cell with a quartz window through which the exciting light was directed. A platinum wire of a cross-sectional area of about 0.2 cm² or a glassy carbon electrode (supplied by IBM Instruments, Inc., Orchard Park, Danbury, CT) having an active surface area of about 1 cm² was used as the counterelectrode in closed-circuit current measurements.

All polarization data under electrostatic conditions (i.e., at open circuit) were performed with a PAR Model 173 potentiostat with appropriate current-to-voltage converter (PAR Model 176) (both marketed by EG&G Princeton Applied Research Corp., P.O. Box 2565, Princeton, NJ) measured against a standard calomel electrode (SCE).

The illumination of the amorphous silicon electrode interfaces in the photoelectrochemical cells was accomplished with a 150 W Xenon short-arc lamp (supplied by Illumination Industries, 825 E. Evelyn Ave., Sunnyvale, CA) The beam was filtered with a 10 cm path length of water to remove IR radiation. The light intensity at the plane of the electrode was about 25 mW/cm² as determined by a calibrated thermopile (supplied by Eppley Laboratory, Inc., 12 Sheffield Ave., Newport, RI).

EXAMPLE III

Open-circuit voltages established between intrinsic (i-type) a-Si:H electrodes in contact with four electrolyte solutions containing different redox couples were measured against a standard calomel electrode (SCE). Initial currents were measured in a closed circuit between the a-Si:H electrodes and a platinum wire used as the counter electrode. Results are listed in Table I. The concentration of redox couples was the same in all runs: about 0.01–0.1 moles/liter.

TABLE I

| Run | Redox Couple | Si Electrode | Initial Voltage (mV) | Initial Current[1] (mA/cm$^2$) | Time to Decay 50% IC[2] | Time to Decay 10% IC[3] |
|---|---|---|---|---|---|---|
| 1 (Control) | $Ce^{4+}/Ce^{3+}$ | i-type Si:H | 1600 | 1.50 | 0.5 | 2.0 |
| 2 (Control) | $Fe^{3+}/Fe^{2+}$ | i-type Si:H | 850 | 0.20 | 1.0 | 8 |
| 3 (Control) | $Fe(CN)_6^{3-}/Fe(CN)_6^{4-}$ | i-type Si:H | 650 | 0.10 | 2.0 | 24 |
| 4 (Invention) | $V^{3+}/V^{2+}$ | i-type Si:H | 20 | $-0.03$[5] | >900 | —[6] |
| 5 (Invention) | $V^{3+}/V^{2+}$ | n-type Si:H | ~0 | 0.01 | —[6] | —[6] |

[1]initial short circuit current expressed in milliampere per cm$^2$ electrode area;
[2]time (seconds) elapsed for current to decay to 50% of the initial current;
[3]time (seconds) elapsed for current to decay to 10% of the initial current;
[4]prepared by reduction with zinc amalgam of a solution of $NH_4VO_3$ in 6M HCl.
[5]electron flow from Pf electrode to a-Si:H electrode.
[6]not measured.

Data in Table I show that the current produced by an undoped, i-type a-Si:H electrode immersed in a $V^{3+}/V^{2+}$ electrolyte solution was initially lower but was significantly more stable than currents produced by the same type of electrode in contact with three other electrolyte solutions. Table I also shows that the direction of the current was opposite to that of the three control cells. In runs 1–3 the current flowed from the illuminated a-Si:H electrode to the Pt-wire, whereas the current in invention run 4 flowed in the opposite direction. It is believed that in runs 1–3, in which the a-Si:H electrode acted as the anode, photooxidation of the electrode surface resulted in a rapid decrease of the current because of the formation of an insulating silicon oxide layer. In invention run 4 the a-Si:H electrode acted as the cathode and the rate of photooxidation was greatly reduced.

We claim:

1. A photoelectrochemical cell comprising a semiconductive intrinsic amorphous silicon hydride cathode.

2. The photoelectrochemical cell of claim 1 further comprising a counterelectrode of a conductive noble metal.

3. The photoelectrochemical cell of claim 1 further comprising an electrolyte dispersed in a liquid medium.

4. The photoelectrochemical cell of claim 3 in which the electrolyte is present in aqueous solution.

5. The photoelectrochemical cell of claim 1 further comprising a redox couple selected from the group consisting of $V^{n+1}/V^n$ and $Eu^{n+1}/Eu^n$, where n is at least 2.

6. The photoelectrochemical cell of claim 1 further comprising a $V^{+3}/V^{+2}$ redox dispersed in a liquid medium in a concentration of about 0.01 to about 1M.

7. The photoelectrochemical cell of claim 6 in which the liquid medium is water.

8. The photoelectrochemical cell of claim 7 furthr comprising a supporting electrolyte.

9. The photoelectrochemical cell of claim 6 in which the $V^{+3}/V^{+2}$ is a product of zinc amalgam reduction of $NH_4VO_3$ in HCl.

10. A method for generating an electric current comprising providing a liquid dispersion or solution of a redox couple selected from $V^{+3}/V^{+2}$ and $Eu^{+3}/Eu^{+2}$, a semiconductive intrinsic amorphous silicon hydride cathode contacting the liquid dispersion or solution, and a noble metal anode contacting the liquid dispersion or solution; providing a complete path for the flow of electrical current from the anode to the cathode; and exposing the semiconductive intrinsic silicon hydride cathode to light of wavelength less than about 720 nm.

11. The method of claim 10 in which the liquid dispersion comprises an aqueous solution of a $V^{+3}/V^{+2}$ redox couple.

12. The method of claim 11 in which the $V^{+3}/V^{+2}$ redox couple is present in the aqueous solution in a concentration of about 0.01 to about 1M.

13. The method of claim 12 comprising exposing the semiconductive amorphous silicon cathode to sunlight.

14. The method of claim 11 comprising providing the $V^{+3}/V^{+2}$ by zinc amalgam reduction of $NH_4VO_3$ in HCl.

15. A photoelectrochemical cell comprising a semiconductive intrinsic amorphous silicon hydride cathode and a redox couple selected from the group consisting of $V^{n+1}/V^n$ and $Eu^{n+1}/Eu^n$, where n is at least 2.

* * * * *